July 22, 1941.   J. H. RICKERMAN ET AL   2,250,052
TREATING HYDROCARBON FLUIDS
Filed Dec. 29, 1938    3 Sheets-Sheet 2
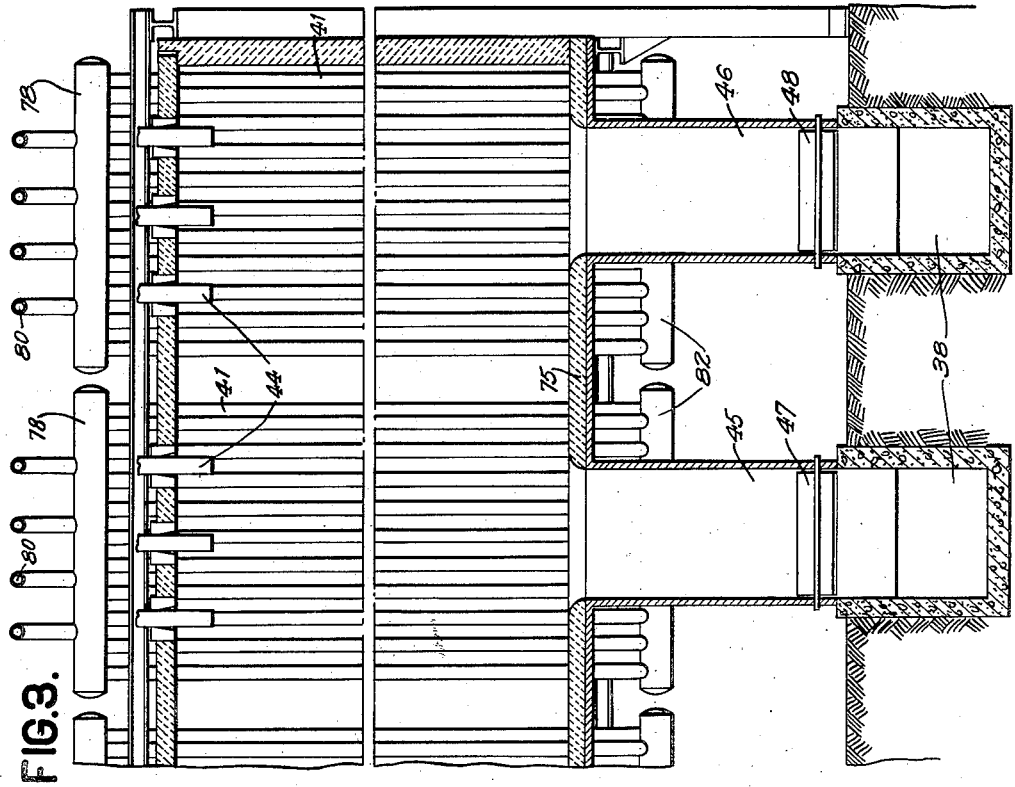
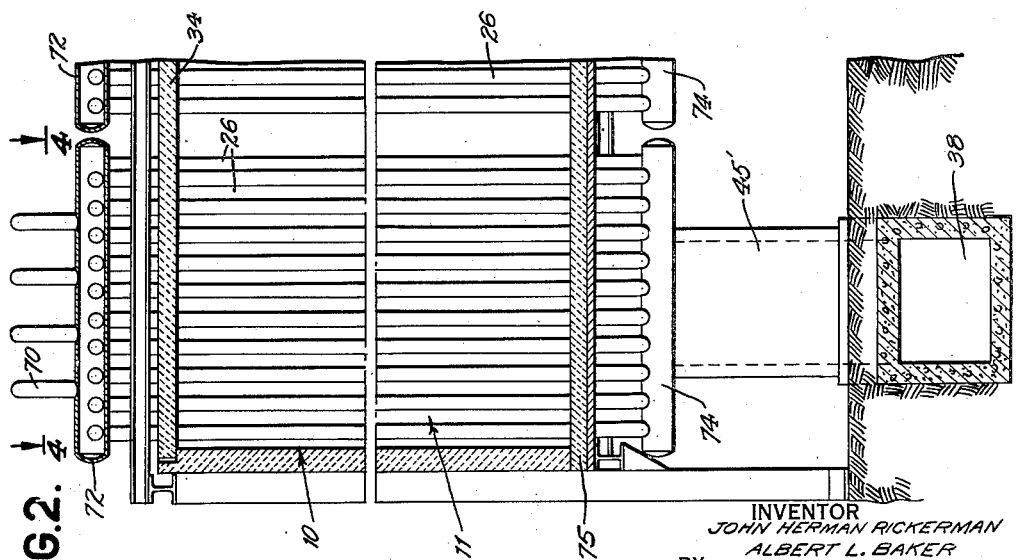
INVENTOR
JOHN HERMAN RICKERMAN
ALBERT L. BAKER
BY
C. J. Liebrecht
ATTORNEY July 22, 1941.   J. H. RICKERMAN ET AL   2,250,052
TREATING HYDROCARBON FLUIDS
Filed Dec. 29, 1938   3 Sheets-Sheet 3

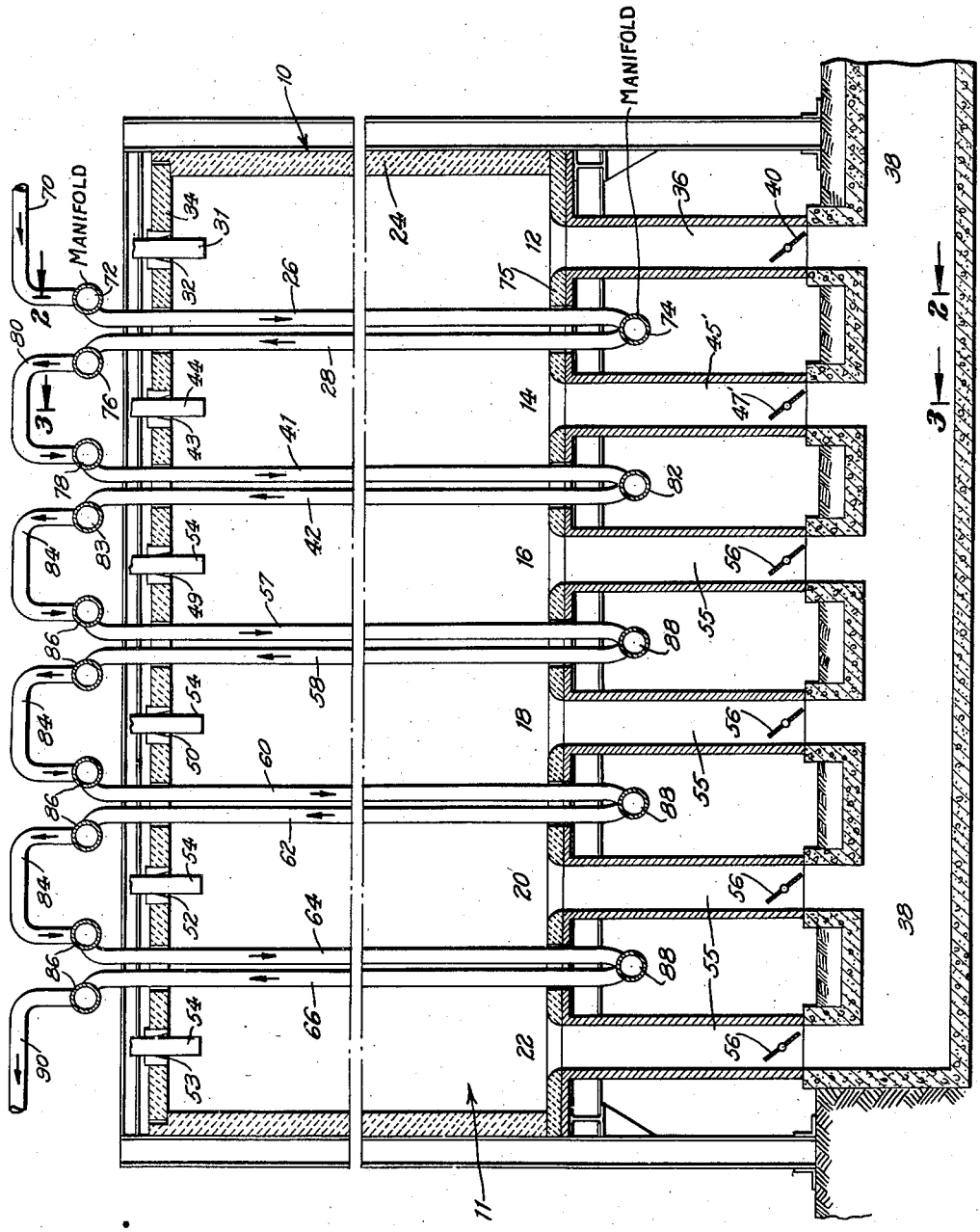

INVENTORS
JOHN HERMAN RICKERMAN
ALBERT L. BAKER
BY
E. F. Liebrecht
ATTORNEY

Patented July 22, 1941

2,250,052

UNITED STATES PATENT OFFICE 2,250,052

TREATING HYDROCARBON FLUIDS

John Herman Rickerman, River Edge, and Albert L. Baker, Summit, N. J., assignors to Gasoline Products Company, Inc., Jersey City, N. J., a corporation of Delaware Application December 29, 1938, Serial No. 248,190

10 Claims. (Cl. 196—116)

This invention relates to improvements in heating apparatus adapted for heating fluids and especially adapted for heating hydrocarbon fluids to elevated or conversion temperatures.

According to this invention a heating chamber is subdivided into a plurality of radiant heating sections by a plurality of rows of vertically arranged heater tubes. The heater tubes form the separations between the separate sections. The separate sections are each preferably down fired but they may be fired in any suitable manner to control the heating of each section. The hot products of combustion are removed from each of the sections by one or more passageways or ducts.

In one form of the invention, fluid such as hydrocarbon fluid to be heated is introduced into a plurality of manifolds positioned near the top of the furnace and arranged substantially in end to end relation and either within the combustion or heating chamber or exterior thereto. From the top manifolds the fluid is passed through a plurality of spaced, vertically arranged tubes which are disposed in the radiant or combustion chamber in the furnace. The fluid is then passed to lower manifolds and thence passes through another set of spaced vertically arranged tubes parallel to the first mentioned tubes.

The lower manifolds may be positioned within or exterior to the furnace and are preferably arranged substantially in end to end relation. The fluid passes through the heater tubes to a second row of top manifolds arranged substantially in end to end relation and then passes through further sets of vertically arranged tubes which form the dividing means or partitions between the various heating sections of the furnace. A plurality of manifolds and spaced sets of heater tubes extend across the heating chamber of the furnace to subdivide the heating chamber into heating sections. In this form of the invention the streams of hydrocarbon fluid pass in parallel flow. Additional manifolds may be included, if desired.

Each radiant heating section is provided with one or more burners or the like arranged in any desirable position to provide radiant heat for each of the sections. Exit passageways or ducts for removing the hot products of combustion are provided for the heating sections.

Single or double rows of vertically arranged heater tubes may be used for dividing the furnace into a plurality of radiant heating sections. Where double rows of heater tubes are used, the tubes in one row are preferably staggered with respect to the tubes in the other row. Any desired flow of fluid through the heater tubes may be provided.

In another form of the invention the hydrocarbon fluid to be heated follows a tortuous path in a single plane across the furnace. The fluid is introduced into a top elongated manifold, is then distributed to and passes through a bank of vertically arranged tubes to a lower elongated manifold from which it is distributed to and passes through another bank of vertically arranged heater tubes in the same plane as the first bank of tubes. From this last set of heater tubes the fluid passes through an elongated top manifold and thence to another bank of vertically arranged heater tubes in the same plane as the first mentioned banks of tubes to a lower elongated manifold and so on across the furnace. The heated hydrocarbon fluid may then be passed through other banks of parallel heater tubes or it may then be subdivided into a plurality of streams and the separate streams passed through parallel banks of heater tubes in parallel flow as above described in connection with the first form of the invetion.

By providing separate heating sections which are separately fired, the heat transfer rate may be varied as desired from one heating section to another heating section and any required temperature gradient may be obtained in the heating sections. The heat transfer may be varied to a great extent within each heating section due to the arrangement of the banks of tubes, the placement and operation of the burners and the placement of flue gas ducts and the operation of the dampers contained therein.

In the drawings:

Fig. 1 diagrammatically represents a transverse vertical cross section taken through one form of a furnace constructed according to our invention and partly broken away to facilitate the disclosure;

Figure 2 represents a partial longitudinal vertical cross section taken substantially along line 2—2 of Fig. 1 with parts omitted to facilitate the disclosure;

Fig. 3 represents a partial longitudinal vertical cross section taken substantially on line 3—3 of Fig. 1 with parts omitted to facilitate the disclosure;

Figure 4:
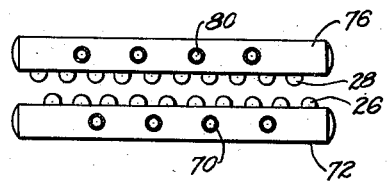
Fig. 4 represents a partial horizontal longitudinal section taken substantially along line 4—4 of Fig. 2 to show the staggered relation of the rows of heater tubes.

Referring now to the drawings the reference character 10 designates a furnace which may be of box type construction and is provided with a combustion or radiant heating chamber 11. The combustion or radiant heating chamber 11 is subdivided into a plurality of radiant heating sections 12, 14, 16, 18, 20 and 22 by pluralities of sets of vertically arranged heater tubes as will be presently described in more detail. The first heating section 12 on three of its sides is formed by the boundary surfaces of the radiant heating chamber 11 of the furnace. On the fourth side are spaced, vertically arranged heater tubes 26 which are in alinement across the heating chamber of the furnace. A second row of spaced, vertically arranged heater tubes 28 is arranged in staggered relation to the first row of tubes 26 across the heating chamber 11 of the furnace.

The staggered rows of heater tubes 26 and 28 form the partition or dividing means between the separate radiant heating sections 12 and 14. No solid walls are used to separate the radiant heating chambers 12, 14, 16, 18, 20 and 22. The tubes themselves are used to form boundaries between the radiant heating chambers. As the partitions are formed by tubes, they permit some communication between the separate radiant heating chambers. While we have shown a certain number of separate radiant heating sections, it is to be understood that this number may be varied as desired.

Each separate radiant heating section is separately fired in any desired manner and the hot products of combustion are removed from each radiant heating section in any desired manner. Burners or the like 31 are preferably arranged in openings 32 in the roof 34 of the radiant heating section 12 for burning fuel such as gas, for example, whereby hot products of combustion are provided for the radiant heating section 12. Preferably each radiant heating section is down fired. The hot products of combustion provide radiant heat for heating hydrocarbon fluid passing through the heater tubes between the radiant heating sections. A plurality of burners or the like is preferably used in each separate radiant heating section as shown in Fig. 3 of the drawings.

The hot products of combustion are preferably removed from radiant heating section 12 by being withdrawn from the bottom thereof through a plurality of flue gas ducts 36 which connect with a larger passageway 38 communicating with all of the flue gas ducts from all the separate radiant heating sections. A plurality of alined flue gas ducts 36 is preferably provided for the radiant heating section 12. Similar flue gas ducts are provided for the remaining separate radiant heating sections 14, 16, 18, 20 and 22. A damper 40 is arranged in each of the ducts 36 in order to regulate the amount of the hot products of combustion removed through each duct and to control the rate of heat transfer to the heater tubes forming one boundary surface of the heating section 12 as will be presently described in greater detail in connection with radiant heating section 14.

The adjacent radiant heating section 14 on one side is bounded on one side by the rows of the vertically arranged heater tubes 26 and 28 as above described and is bounded on the opposite side by staggered rows of spaced vertically arranged heater tubes 41 and 42 which are similar to the staggered rows of tubes 26 and 28. The remaining two sides are formed by the boundary surfaces of the radiant heating chamber 11 of the furnace. Radiant heating section 14 is provided with an opening 43 adapted to receive a burner 44 or for receiving hot products of combustion from any source. The heating section 14 is also separately fired preferably from the top and the hot products of combustion are removed from the bottom of the radiant heating section 14 through ducts 45, 45' and 46, for example, as shown in Figs. 1 and 3. Only two ducts are shown in Fig. 3. Duct 45 is provided with damper 47 and duct 46 is provided with damper 48. In Fig. 1 duct 45' is provided with damper 47'. As shown in Fig. 3 there are three burners 44 provided for each bank of heater tubes 41 associated with each top and bottom manifold as will be described hereinafter and one duct is provided for each set of burners.

In this way heating of portions of each separate heating section may be controlled. For example, by operating damper 47 to partly close it, more combustion products will be passed to an adjoining portion of radiant heating section 14, as for instance to the right in Fig. 3 and these products will then be added to the products of combustion passing through duct 46 and more heat will be passed to the bank of tubes above flue duct 46 to heat them to a greater degree. In a similar way some of the combustion products would pass to the left in Fig. 3 and pass through a duct (not shown). By varying the openings by the dampers 47 and 48 etc. in the ducts 45 and 46 etc. it will be seen that the heating of the hydrocarbon fluid is further controlled. Each radiant heating section 12, 14, 16, 18, 20 and 22 is preferably provided with this control construction. The heater tubes between the radiant heating section are in communication as will be hereinafter described to provide for heating streams of hydrocarbon fluid in parallel flow.

From the above description it will be seen that the heater tubes 26 and 28 arranged in staggered relation are exposed on one side to direct radiant heat in the radiant heating section 12 and on the other side to radiant heat in the adjacent radiant heating section 14 so that all the heater tubes 26 and 28 are heated on both sides by radiant heat. In this way the hydrocarbon fluid passing through the heater tubes 26 and 28 is uniformly heated. The remaining heating sections 16, 18, 20 and 22 are each provided with openings 49, 50, 52 and 53 in the roof of the furnace adapted to receive burners 54 for supplying hot products of combustion to the separate radiant heating sections. Each radiant heating section 16, 18, 20 and 22 is provided with flue gas ducts 55 similar to the ones described in connection with radiant heating sections 12 and 14. Each duct is provided with dampers 56 for controlling the heating of the separate radiant heating sections. The spaced sets of staggered rows of spaced vertically arranged heater tubes 57 and 58, 60 and 62, 64 and 66, provide the separating means or partitions in the heating chamber 11 of the furnace to form radiant heating sections 16, 18, 20, and 22, respectively. Radiant heating section 22 at the other side of the radiant heating chamber 11 of the furnace is similar to radiant heating section 12 in that it is bounded on one side only by the rows of heater tubes 64 and 66.

The flow of hydrocarbon fluid or other fluid to be heated through the banks of heater tubes will now be described. The fluid is passed through a plurality of sets of tubes or pipes 70 and introduced into the first top manifold 72 arranged above the first heating section 12. A plurality of top manifolds 72 is provided, the manifolds being in alinement across the furnace. If desired, only one pipe 70 may be used for introducing fluid into each top manifold. From the manifolds 72 the fluid passes downwardly through the vertically arranged heater tubes 26 to lower manifolds 74 arranged below the floor 75 of the heating chamber 11. The lower manifolds are in alinement and are similar to the top manifolds 72. As shown in Fig. 1 of the drawings the lower manifolds are arranged between adjacent flue gas ducts 36 and 45'.

By providing a plurality of top manifolds 72 and bottom manifolds 74 it will be seen that a plurality of streams of fluid is passed downwardly through the heater tubes 26. During the passage through these heater tubes 26 the fluid absorbs heat from the heater tubes 26, the heater tubes being exposed to direct radiant heat on both sides thereof. After being heated in heater tubes 26, the separate streams are passed into lower manifolds 74 wherein the fluids are mixed in each manifold and a substantially uniform temperature is obtained.

Radiant heat is supplied to the separate radiant heating chambers 12, 14, 16, 18, 20 and 22 by burning a suitable fuel by means of the burners 31, 44 and 54 located in the upper portions of the heating chambers 12, 14, 16, 18, 20 and 22. The heating of each radiant heating chamber is easily controlled by having separate heating chambers and by having burners for each chamber. In this way the burners in one radiant heating chamber may be adjusted to burn more fuel so as to heat the one radiant heating chamber to a greater degree than the others. Or less fuel may be burned in the radiant heating chamber if a lower temperature is desired in that chamber. In this way the heating of the separate radiant heating chambers may be controlled as desired. Any required temperature gradient may be obtained. The heat transfer may be varied to a great extent in each radiant heating section by operation of the burners and the dampers in the flue gas ducts.

The fluid then passes from the lower manifolds 74 through the plurality of banks of vertically arranged tubes 28 where it is further heated in the heater tubes 28 which are exposed to direct radiant heat on both sides thereof. The heated fluid is then passed to a plurality of alined top manifolds 76, each top manifold 76 being preferably connected with the next top manifold 78 by means of pipes 80. The streams of hydrocarbon fluid are mixed in top manifolds 76 and 78 to obtain a substantially uniform temperature. The streams of fluid then pass down through the rows of vertically arranged heater tubes 41 which communicate with the lower manifolds 82 and then up through rows of vertically arranged heater tubes 42 to other top manifolds 83. The heated streams of fluid follow the same general path through the rest of the staggered rows of heater tubes 57, 58, 60, 62, 64 and 66 forming the dividing walls between the remaining separate radiant heating sections and through the top connecting pipes 84 which connect the top manifolds 86 and through the bottom manifolds 88. The separate streams of hydrocarbon fluid are mixed in each manifold as above described.

After passing through the several banks of staggered tubes, the streams of heated fluid leave the furnace through outlets 90 and the heated hydrocarbon fluid may be further treated as desired to separate desired constituents. Instead of passing the hydrocarbon fluid into top manifold and withdrawing it from a top manifold near one end of the furnace, the hydrocarbon fluid may be introduced into a bottom manifold, passed through spaced banks of heater tubes and then be withdrawn from a bottom or top manifold near one end of the furnace.

Instead of using staggered rows of heater tubes to provide boundary surfaces between the separate heating sections we may use a single row of tubes arranged to form boundary surfaces between the separate heating sections. In this arrangement the heater tubes will also be heated on both sides by radiant heat in the separate radiant heating sections.

Figure 5:
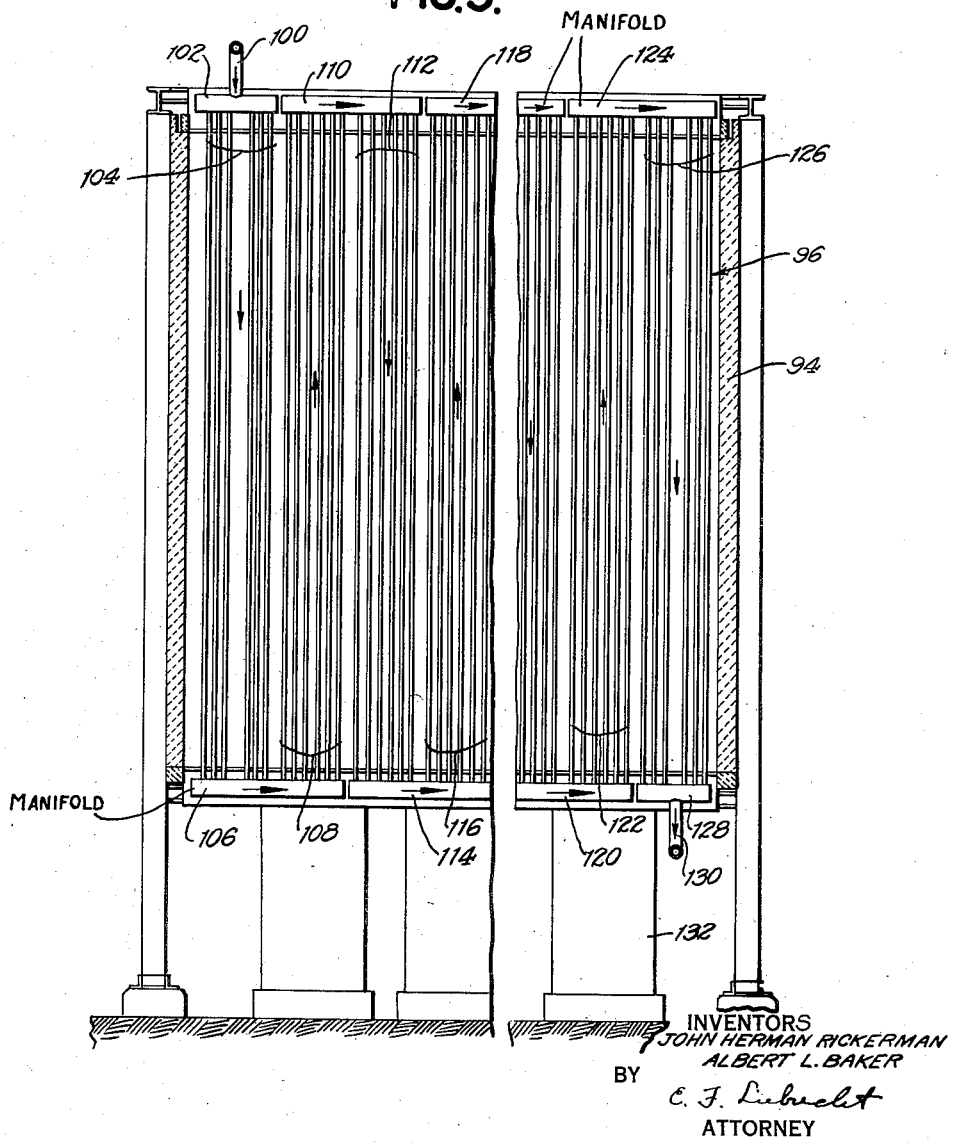
Fig. 5 diagrammatically represents a longitudinal cross section taken through another form of a furnace constructed according to our invention with parts broken away to facilitate the disclosure.

Instead of passing a plurality of streams through banks of heater tubes arranged across the heating chamber of the furnace as above described in connection with the form of the invention shown in Figs. 1, 2, 3 and 4, the fluid may be heated by passing it as a single stream across the width of the furnace so that the hydrocarbon fluid will follow a tortuous path in a single plane across the furnace. A construction whereby this flow may be obtained is shown in Fig. 5 of the drawings. The fluid to be heated is introduced through line 100 into a top short manifold 102 from which it is distributed into a bank of vertically arranged heater tubes 104. After passing downwardly through these heater tubes, the fluid is introduced into a lower manifold 106 which is longer than the top manifold 102 and which communicates with another bank of vertically arranged tubes 108. In the lower manifold 106 the fluid stream passes to the right as shown in Fig. 5 of the drawings by the arrow. The fluid then passes upwardly through the bank of vertically arranged tubes 108 to a top manifold 110 which is substantially in end to end alinement with the top manifold 102 and which is of substantially the same size as the lower manifold 106 but longer than top manifold 102. In this top manifold 110 the fluid passes to the right as shown in Fig. 5 and then down through another bank of vertically arranged tubes 112 to a lower manifold 114 which is substantially in end to end alinement with the lower manifold 106 and which is of substantially the same size as manifolds 106 and 110.

From the lower manifold 114 the fluid passes upwardly through a bank of vertically arranged heater tubes 116 to a top manifold 118. The fluid follows the same general tortuous path through similar manifold and heater tube arrangements across the furnace and in a similar manner passes through lower manifold 120 and upwardly through a bank of vertically arranged tubes 122 communicating with a top manifold 124 and then downwardly through a bank of vertically arranged heater tubes 126 which empty the heated fluid into a lower manifold 128. The bottom manifold 128 as shown in the drawings is smaller than the rest of the bottom manifolds and is substantially the same length as the first top manifold 102.

The heated fluid is withdrawn from the bottom manifold 128 through a pipe 130. From this point the heated fluid may pass through other heater tubes which form the boundaries or partitions between the other heating sections in a similar flow to that just described in connection with Fig. 5 of the drawings. Or, the heated fluid leaving the lower manifold 128 through line 130 may be subdivided into a plurality of streams and the streams passed through the rest of the banks of heater tubes in separate streams in parallel flow as above described in connection with the form of the invention shown in Figs. 1, 2, 3, and 4 of the drawings.

Each radiant heating section in a construction as shown in Fig. 5 of the drawings is preferably provided with a plurality of burners arranged to fire the separate sections from the top of the furnace and with a plurality of flue gas ducts leading from the bottom of each radiant heating section. Single rows of heater tubes or staggered rows of heater tubes may be used.

By passing the hydrocarbon fluid to be heated through heater tubes arranged as shown in Fig. 5, the hydrocarbon fluid is uniformly heated because it all passes through the entire heating zone and is intermittently mixed when it is introduced into the top and lower manifolds and before it is passed through another of the banks of heater tubes. Because of the relatively long path of the hydrocarbon fluid, the hydrocarbon fluid can be rapidly heated at the beginning of the heating operation if desired.

A convection heating section or sections containing heater tubes may be included to recover heat from the combustion gases leaving the radiant heating chambers and passing through the main duct 38. The convection heater tubes may be used as a preheating section or sections for hydrocarbon fluids to be heated in the radiant heating sections or as a soaking section or sections for hydrocarbon fluids after being heated in the radiant heating sections.

An example for converting natural gas to lower molecular weight hydrocarbons will now be given. The natural gas at a temperature of about 60° F. and at about 10 pounds per square inch gauge pressure is introduced into the top manifolds 72 and is passed downwardly through banks of heater tubes 26 and upwardly through banks of heater tubes 28 and leaves the heater tubes 28 at a temperature of about 1081° F. The heated gas is then passed through the banks of tubes 41 and 42 and leaves the heater tubes 42 at a temperature of about 1523° F. The heated gas is then passed through heater tubes 57 and 58 and leaves the heater tubes 58 at a temperature of about 1778° F. After passing through the heater tubes 60 and 62, the gas is heated to about 1893° F. and after passing through the last rows of heater tubes 64 and 66, the gas has been heated to about 1967° F. and leaves the last top manifolds 86 through lines 90 at about atmospheric pressure. By this treatment the natural gas is converted to lower molecular weight hydrocarbons and the products of conversion containing unsaturated hydrocarbons may be further treated as desired to separate desired constituents therefrom.

During the above treatment, the burners are operated to obtain the desired heating in the separate radiant heating chambers. In the above example, the products of combustion leave the radiant heating chambers 12, 14, 16, 18, 20 and 22 at about 1880° F., 1490° F., 1390° F., 1165° F., 1030° F., and 1255° F., respectively.

The above example is given merely as an illustration of one method of treating hydrocarbons and we are not to be restricted thereto as different operating conditions may be used as described.

Instead of passing gaseous hydrocarbons through the heater tubes in the furnace, our process and apparatus may be used for heating and converting normally liquid hydrocarbons to convert them to lower boiling hydrocarbons. Our invention may also be used for heating hydrocarbon fluids to polymerization temperatures.

While several forms of our invention have been disclosed it is to be understood that these are by way of illustration only and we are not to be limited thereto as changes and modifications may be made without digressing from our invention.

We claim:

1. A heating apparatus adapted for heating hydrocarbon fluid including a housing, a plurality of spaced sets of double rows of vertically arranged heater tubes extending across said housing, the heater tubes in said double rows being in staggered relation and dividing said housing into a plurality of separate radiant heating chambers, burners in the upper portion of each radiant heating chamber whereby hot products of combustion are introduced into said radiant heating chambers for supplying radiant heat thereto, flues in the lower portion of each radiant heating chamber for withdrawing products of combustion therefrom, means for connecting said heater tubes, said means including top manifolds and bottom manifolds located exteriorly of said housing, each manifold being associated with a certain number of heater tubes, certain of said top manifolds associated with one row of heater tubes being in communication with the top manifolds associated with another row of heater tubes whereby hydrocarbon fluid introduced into the top manifolds is subdivided into a plurality of streams which pass downwardly through one row of one set of heater tubes exposed to radiant heat on both sides and are passed to lower manifolds wherein certain of the streams are mixed and then again subdivided into a plurality of streams and then passed through the other row of said set of heater tubes exposed to radiant heat on both sides and passed to other top manifolds wherein certain of the streams are mixed and then subdivided and passed through other heater tubes exposed to direct radiant heat and passed to other manifolds and so on until the streams of hydrocarbon fluid have passed through all said sets of heater tubes in parallel flow.

2. A heating apparatus adapted for heating hydrocarbon fluids which includes a housing, a plurality of spaced rows of vertically arranged heater tubes extending across said housing, said heater tubes dividing said housing into a plurality of separate radiant heating chambers, burners in the upper portion of each radiant heating chamber whereby hot products of combustion are introduced into each of said radiant heating chambers to supply radiant heat thereto, flues in the lower portion of each radiant heating chamber for withdrawing products of combustion, means for connecting said heater tubes, said means including top manifolds and bottom manifolds located exteriorly of said housing and tubes for connecting certain of said manifolds, each manifold being associated with a certain number of heater tubes, the manifolds in at least one row of heater tubes being so arranged that hydrocarbon fluid introduced into one top manifold is subdivided into a plurality of streams which pass downwardly through one group of heater tubes to a lower manifold wherein the streams are mixed, then upwardly through another group of heater tubes in the same plane as the first group of heater tubes, then to another top manifold and down through another group of heater tubes to another lower manifold and then upwardly and downwardly through other groups of heater tubes in the same plane until the hydrocarbon fluid has passed across the housing in a tortuous path in one plane so that the hydrocarbon fluid is uniformly and rapidly heated.

3. A heating apparatus adapted for heating hydrocarbon fluids including a housing, a plurality of spaced rows of vertically arranged heater tubes extending across said housing, said heater tubes dividing said housing into a plurality of separate radiant heating chambers, means associated with each radiant heating chamber whereby hot products of combustion are introduced into said radiant heating chambers to supply radiant heat thereto, flues associated with each radiant heating chamber for withdrawing products of combustion therefrom at a plurality of places, means for connecting said heater tubes, said means including top manifolds and bottom manifolds located exteriorly of said housing, tubes for connecting certain of said manifolds, each manifold being associated with a group of heater tubes, the manifolds in at least one row of heater tubes being so arranged that hydrocarbon fluid passes from one manifold through one group of vertically arranged heater tubes to another manifold, then through another group of vertically arranged heater tubes in the same plane as the first group of vertically arranged heater tubes, then to another manifold and down through another group of heater tubes to another manifold and then upwardly and downwardly through other groups of heater tubes in the same plane until the hydrocarbon fluid passes across the housing in a tortuous path in one plane so that the hydrocarbon fluid is uniformly and rapidly heated.

4. A heating apparatus adapted for heating hydrocarbon fluids which includes a housing, a plurality of spaced rows of vertically arranged heater tubes extending across said housing to form a plurality of radiant heating chambers, said heater tubes forming separating means between said heating chambers, a plurality of top and bottom manifolds interconnecting heater tubes in each row and formed to provide for a tortuous flow of hydrocarbon fluid in plural streams and in single plane across said housing, means for supplying hot products of combustion to each of said radiant heating chambers whereby all of the heater tubes are exposed on both sides thereof to direct radiant heat, and means for removing products of combustion from each of said radiant heating chambers in a plurality of places.

5. A method of heating hydrocarbon fluids in a heating apparatus containing top and lower manifolds communicating with spaced banks of vertically arranged heater tubes with the heater tubes subdividing the heating apparatus into a plurality of radiant heating chambers, which comprises introducing hydrocarbon fluid into a plurality of top manifolds, subdividing the hydrocarbon fluid into streams and passing them downwardly through one bank of vertically arranged heater tubes to lower manifolds wherein the streams of hydrocarbon fluid introduced into each lower manifold are mixed, then subdividing the hydrocarbon fluids into streams and passing them upwardly through another bank of vertically arranged heater tubes to other top manifolds wherein the streams of hydrocarbon fluid introduced into each top manifold are mixed and then continuing the passage of hydrocarbon fluid through the remaining manifolds and banks of heater tubes, introducing hot products of combustion into the upper portion of each of said radiant heating chambers to supply radiant heat to each radiant heating chamber and heating the vertically arranged heater tubes by direct radiant heat on both sides thereof, and withdrawing products of combustion from the lower portion of each radiant heating chamber.

6. A method of heating hydrocarbon fluids in a heating apparatus containing top and lower manifolds communicating with spaced rows of sets of double rows of vertically arranged heater tubes with the heater tubes in each row being staggered and subdividing the heating apparatus into a plurality of radiant heating chambers, which comprises introducing hydrocarbon fluid into a plurality of alined top manifolds, subdividing the hydrocarbon fluid into streams and passing them downwardly through one bank of the first row of vertically arranged heater tubes to lower manifolds wherein the streams of hydrocarbon fluid introduced into said lower manifolds are mixed, then again subdividing the hydrocabon fluid into streams and passing them upwardly through the other bank of the first row of vertically arranged heater tubes to other top manifolds and then continuing the passage of hydrocarbon fluid through the remaining manifolds and banks of heater tubes in parallel flow, introducing hot products of combustion into the upper portion of each of said radiant heating chambers to supply radiant heat to each chamber and heating the staggered rows of vertically arranged heater tubes by direct radiant heat on both sides thereof, and withdrawing products of combustion from the lower portion of each radiant heating chamber.

7. A method of heating hydrocarbon fluids in a heating apparatus containing top and lower manifolds communicating with spaced banks of vertically arranged heater tubes with the heater tubes subdividing the heating apparatus into a plurality of radiant heating chambers, which comprises introducing hot products of combustion in controlled amounts into each of said separate radiant heating chambers to supply radiant heat thereto and heating the vertically arranged heater tubes by direct radiant heat on both sides thereof, introducing hydrocarbon fluid into a top manifold, subdividing the hydrocarbon fluid into streams and passing them downwardly through one bank of vertically arranged heater tubes exposed to radiant heat on both sides thereof to heat the streams of hydrocarbon fluid, controlling the heating of adjacent radiant heating chambers to control the heating of the streams of hydrocarbon fluid passing through said heater tubes, then passing the partly heated streams of hydrocarbon fluid to a lower manifold wherein the streams of hydrocarbon fluid introduced into said lower manifold are mixed, then subdividing the partly heated hydrocarbon fluid from the lower manifold into streams and passing them upwardly through another bank of vertically arranged heater tubes exposed to radiant heat on both sides thereof to further heat the hydrocarbon fluid, controlling the heating of adjacent radiant heating chambers, and continuing the passage of hydrocarbon fluid through the remaining manifolds and banks of vertically arranged heater tubes to effect the desired extent of heating and withdrawing controlled amounts of products of combustion from each radiant heating chamber to further control the heating of the hydrocarbon fluid being passed through said vertically arranged heater tubes.

8. A method of heating hydrocarbon fluids in a heating apparatus containing top and lower manifolds communicating with spaced banks of vertically arranged heater tubes with the heater tubes subdividing the heating apparatus into a plurality of radiant heating chambers, which comprises introducing hydrocarbon fluid into a manifold and passing it through a group of vertically arranged heater tubes to another manifold, then passing it through another group of vertically arranged heater tubes in the same plane as said first group of heater tubes to another manifold and then through other groups of vertically arranged heater tubes and manifolds until the hydrocarbon fluid has passed across said heating apparatus and then passing the hydrocarbon fluid through other banks of heater tubes for further heating the hydrocarbon fluid, introducing hot products of combustion into the upper portion of each radiant heating chamber for heating the vertically arranged heater tubes by direct radiant heat on both sides thereof and withdrawing products of combustion from the lower portion of each radiant heating chamber.

9. A method of heating hydrocarbon fluids in a heating apparatus containing top and lower manifolds communicating with spaced banks of vertically arranged heater tubes with the heater tubes subdividing the heating apparatus into a plurality of radiant heating chambers, which comprises introducing controlled amounts of hot products of combustion into the upper portion of each radiant heating chamber for heating the vertically arranged heater tubes by direct radiant heat on both sides thereof and withdrawing controlled amounts of products of combustion from the lower portions of each radiant heating chamber, introducing hydrocarbon fluid into a top manifold and subdividing it into streams of hydrocarbon fluid and passing them downwardly through a group of vertically arranged heater tubes heated on both sides by radiant heat to a lower manifold wherein the streams are mixed, then subdividing the partly heated hydrocarbon fluid into streams and passing them upwardly through another group of vertically arranged heater tubes in the same plane as said first group of heater tubes to another top manifold and then through other groups of vertically arranged heater tubes and lower and top manifolds until the hydrocarbon fluid has passed across said heating apparatus and then passing the preheated hydrocarbon fluid through other banks of vertically arranged heater tubes for further heating the hydrocarbon fluid.

10. A method of heating hydrocarbon fluids in a heating apparatus containing top and lower manifolds communicating with spaced banks of vertically arranged heater tubes with the heater tubes subdividing the heating apparatus into a plurality of radiant heating chambers, which comprises introducing hydrocarbon fluid into a top manifold, subdividing the hydrocarbon fluid into streams and passing them downwardly through one bank of vertically arranged heater tubes to a lower manifold wherein the streams of hydrocarbon fluid are mixed, then subdividing the hydrocarbon fluids into streams and passing them upwardly through another bank of vertically arranged heater tubes to another top manifold wherein the streams of hydrocarbon fluid are mixed and then continuing the passage of hydrocarbon fluid through the remaining manifolds and banks of heater tubes, introducing hot products of combustion into the upper portion of each of said radiant heating chambers to supply radiant heat to each radiant heating chamber and heating the vertically arranged heater tubes by direct radiant heat on both sides thereof, and withdrawing products of combustion from the lower portion of each radiant heating chamber.

JOHN HERMAN RICKERMAN.
ALBERT L. BAKER.